United States Patent [19]
Einkauf et al.

[11] Patent Number: 5,841,442
[45] Date of Patent: Nov. 24, 1998

[54] METHOD FOR COMPUTING PARAMETERS USED IN A NON-HOMOGENEOUS SECOND ORDER PERSPECTIVE TEXTURE MAPPING PROCESS USING INTERPOLATION

[75] Inventors: Mark Alan Einkauf, Leander; Michael Kerry Larson, Austin, both of Tex.

[73] Assignee: Cirrus Logic, Inc., Fremont, Calif.

[21] Appl. No.: 777,558

[22] Filed: Dec. 30, 1996

[51] Int. Cl.$^6$ .................................................. G06F 15/00
[52] U.S. Cl. ............................................................ 345/430
[58] Field of Search .................................. 345/430, 429, 345/428, 427, 419, 150

[56] References Cited

U.S. PATENT DOCUMENTS

| | | | |
|---|---|---|---|
| 4,583,185 | 4/1986 | Heartz et al. | 364/521 |
| 4,586,038 | 4/1986 | Sims | 340/729 |
| 4,692,880 | 9/1987 | Merz et al. | 364/521 |
| 4,714,428 | 12/1987 | Bunker et al. | 434/43 |
| 4,715,005 | 12/1987 | Heartz | 364/521 |
| 4,727,365 | 2/1988 | Bunker et al. | 340/728 |
| 4,811,245 | 3/1989 | Bunker et al. | 364/521 |
| 4,821,212 | 4/1989 | Heartz | 364/521 |
| 4,825,391 | 4/1989 | Merz | 364/526 |
| 4,855,937 | 8/1989 | Heartz | 364/521 |
| 4,862,388 | 8/1989 | Bunker | 364/521 |
| 4,905,164 | 2/1990 | Chandler et al. | 364/521 |
| 4,958,305 | 9/1990 | Piazza | 364/522 |
| 4,965,745 | 10/1990 | Economy et al. | 364/518 |
| 5,126,726 | 6/1992 | Howard et al. | 340/728 |
| 5,187,754 | 2/1993 | Currin et al. | 382/54 |
| 5,191,642 | 3/1993 | Quick et al. | 395/127 |
| 5,268,996 | 12/1993 | Steiner et al. | 395/126 |
| 5,293,467 | 3/1994 | Buchner et al. | 395/122 |
| 5,357,579 | 10/1994 | Buchner et al. | 382/1 |
| 5,367,615 | 11/1994 | Economy et al. | 395/129 |
| 5,420,970 | 5/1995 | Steiner et al. | 395/133 |
| 5,651,106 | 7/1997 | Ashburn | 395/141 |
| 5,680,525 | 10/1997 | Sakai et al. | 395/130 |
| 5,701,405 | 12/1997 | Kelley et al. | 395/141 |

FOREIGN PATENT DOCUMENTS

WO 96/36011  11/1996  WIPO.

*Primary Examiner*—Phu K. Nguyen
*Attorney, Agent, or Firm*—Wagner, Murabito & Hao; Steven A. Shaw

[57] ABSTRACT

A method for computing input parameters used in a non-homogeneous second order perspective texture mapping process using interpolation. The present invention receives a polygon primitive (e.g., triangle) including screen display coordinates and texture map coordinates for each vertex (vmin, vmid, and vmax). Based on vertex information including perspective weights, w, screen display coordinates and texture map coordinates are determined for midpoints (i and j) of the two triangle slopes opposite the triangle's major slope. Based on a determined quadratic equation of the triangle's major slope, screen coordinates and texture map coordinates are determined at several selected points (e.g., imain, jmain, and midmain) along the major slope that corresponds to the i, j, and vmid points. From these values, quadratic coefficients a1, a2, and du_ortho_add are computed and also quadratic coefficients b1, b2 and dv_ortho_add are computed. The above values, parameters u_main, du_main (change in u over change in y), d2u_main (change in $\Delta u$ over change in $\Delta y$), du_ortho (change in u over change in x), d2u_ortho (change in $\Delta u$ over change in $\Delta x$), v_main, dv_main (change in v over change in y), d2v_main (change in $\Delta v$ over change in $\Delta y$), dv_ortho (change in v over change in x), and d2v_ortho (change in $\Delta v$ over change in $\Delta x$) are computed and forwarded to a non-homogenous second order perspective texture mapping process using interpolation. The above texture mapping process is extremely efficient as it is free of division operations during the interpolation.

19 Claims, 8 Drawing Sheets

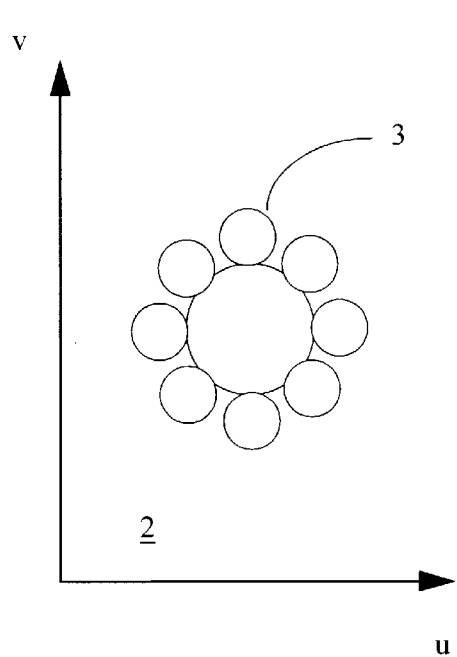
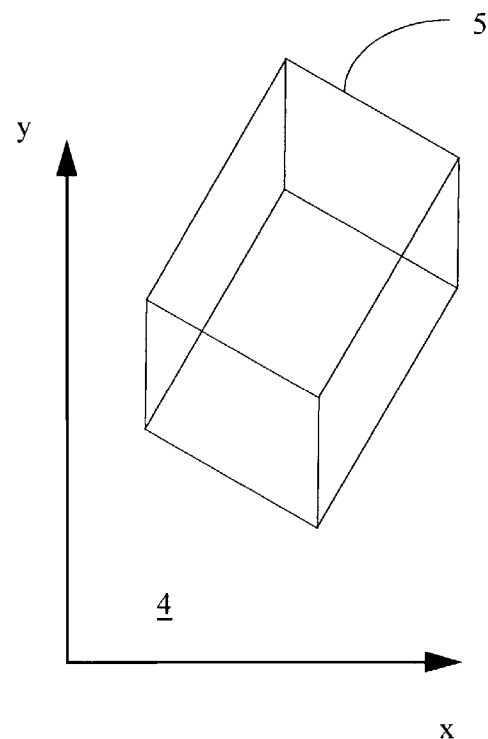
PRIOR ART
FIGURE 1A
PRIOR ART
FIGURE 1B

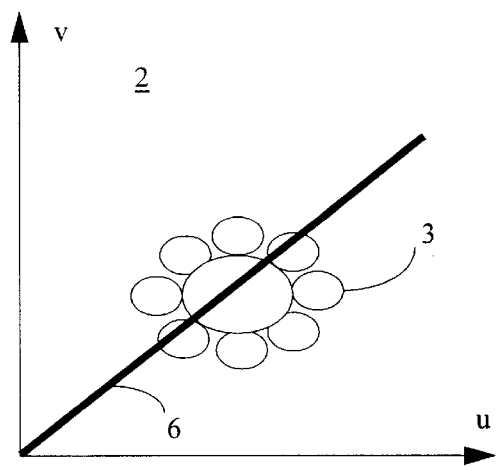
PRIOR ART FIGURE 2A
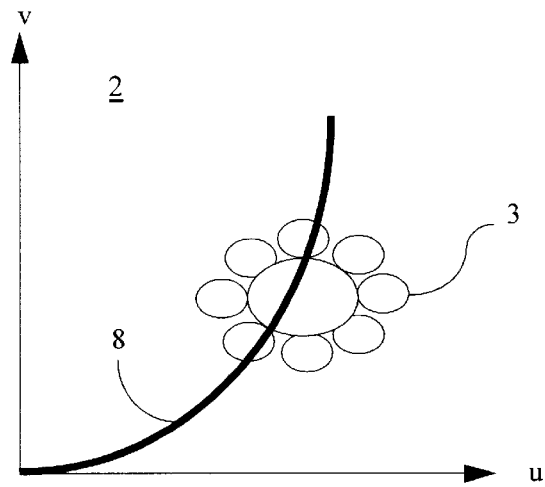
PRIOR ART FIGURE 2B
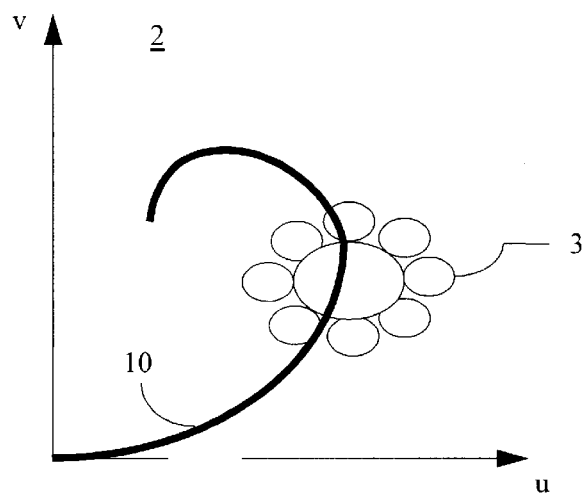
PRIOR ART FIGURE 2C

METHOD FOR COMPUTING PARAMETERS USED IN A NON-HOMOGENEOUS SECOND ORDER PERSPECTIVE TEXTURE MAPPING PROCESS USING INTERPOLATION

FIELD OF THE INVENTION

The present invention relates to the field of computer controlled graphics display systems. More specifically, the present invention relates to computer controlled graphics display systems utilizing interpolation to perform certain graphics features.

BACKGROUND OF THE INVENTION

Computer controlled graphics systems are used for displaying graphics objects on a display. These graphics objects are composed of graphics primitive elements ("graphics primitives") that include points, lines, polygons, etc. The graphics primitives can be used to render a 2 dimensional (2-D) image of a three dimensional (3-D) object on a display screen. Texture mapping refers to techniques for adding surface detail to areas or surfaces of these 3-D graphics objects displayed on a 2-D display. Since the original graphics object is 3-D, texture mapping often involves maintaining certain perspective attributes with respect to the surface detail added to the object. Generally, texture mapping occurs by accessing encoded surface detail points or "texels" from a memory storing the surface detail and transferring the surface detail texels to predetermined points of the graphics primitive to be texture mapped. The manner in which the texels are accessed is used to provide the perspective discussed above.

With reference to prior art FIGS. 1A and 1B, a texture map 2 and a display screen 4 are shown. The texture map 2 contains a texture image 3 to be mapped onto an area or surface of a graphics object 5 on the display screen 4. The texture map 2 includes point elements (texels) which reside in a (u, v) texture coordinate space. The texture image 3 is represented in computer memory as a bitmap or other raster-based encoded format. The display screen 4 includes point elements (pixels) which reside in an (x, y) display coordinate space. More specifically, texture mapping operates by applying color or visual attributes of texels of the (u, v) texture map 2 to corresponding pixels of the graphics object 5 on the display screen 4. In texture mapping, color values for pixels in (x, y) display coordinate space are determined based on sampled texture map values. After texture mapping, a version of the texture image 3 is visible on surfaces of the object 5.

Three types of texture mapping are described below, linear, second order homogeneous perspective and second order non-homogeneous perspective. In linear texture mapping, texels of a texture map are generally mapped onto pixels of a 2-D or 3-D graphics object linearly whereby the rate of sampling in texel space with respect to the screen coordinate update rate is constant, e.g., du/dx and du/dy are constant values. In perspective texture mapping, texels of a texture map are generally mapped onto pixels of a 3-D graphics object that is displayed in 2-D space (x, y) wherein the rate of sampling in texel space with respect to the rate of screen coordinate update rate is not constant. Perspective texture mapping features an illusion of depth which is created by varying the sampling rate of the texture map 2 during the normal linearly performed polygon rendering process on the display screen 4. With reference to prior art FIG. 1A and FIG. 1B, the texture image 3 is mapped onto surfaces of a 2-D rendition of the 3-D graphics object 5 on the display screen 4.

With reference to prior art FIG. 2A, a linear texture sampling path 6 is shown in the (u, v) texture coordinate space that is traversed ("sampled") during texture map sampling. During linear texture map sampling, the texture image 3 is sampled according to path 6 simultaneously with a well known linear polygon rendering process. Path 6 can be represented by a linear equation of u and v. Each texel of the texture map 2 is defined according to (u, v) coordinates. The rates of change of u and v with respect to x and y (e.g., du/dx, du/dy, dv/dx, and dv/dy) of the linear sampling path 6 of FIG. 2A, are constant values for linear texture map sampling.

With reference to FIG. 2B, a second order homogeneous perspective texture sampling path 108 is shown in (u, v) texture coordinate space. The rates of change of u and v with respect to x and y (e.g., du/dx, du/dy, dv/dx, and dv/dy) of the second order homogeneous perspective sampling path 8 are varying values. However, the rates of change of the rates of change of u and v with respect to x and y (e.g., $d^2u/_{dx}{}^2$, $d^2u/_{dy}{}^2$, $d^2v/_{dx}{}^2$, and $d^2v/_{dy}{}^2$) of the second order homogenous perspective sampling path 8 are constant and thus homogenous values. During homogenous second order texture map sampling, the texture map 2 is sampled according to path 8 during the polygon rendering process. Path 8 can be represented by a homogenous second order polynomial equation of u and v.

With reference to Prior Art FIG. 2C, a non-homogenous second order perspective sampling path 10 is shown in (u, v) texture coordinate space. The rates of change of u and v with respect to x and y (e.g., du/dx, du/dy, dv/dx, and dv/dy) along sampling path 10 are varying values. The rates of change of the rates of change of u and v with respect to x and y (e.g., $d^2u/_{dx}{}^2$, $d^2u/_{dy}{}^2$, $d^2v/_{dx}{}^2$, and $d^2v/_{dy}{}^2$) of the second order perspective sampling path 10 are also varying values and non-homogenous (e.g., the second order rate of change of u is defined by multiple functions of v). During non-homogenous second order texture map sampling, the texture map 2 is sampled according to path 10 during the polygon rendering process. Path 10 can be represented by a non-homogenous second order non-homogenous polynomial equation of u and v.

In typical prior art second order perspective texture mapping techniques, linear terms are generated and divided by perspective terms to obtain perspective texture map sample coordinates, T(u, v), for a given display coordinate in (x, y) display coordinate space. The coordinates (u, v) can then be used to obtain a color value from a texture map, T, according to T(u, v). The below relationship illustrates an exemplary second order perspective texture mapping relationship in which linear terms, Du and Dv, are divided by perspective terms, W(x, y, z), which represent depth, to obtain perspective texture map sample position rates of change, du and dv, $$(du, dv) = (du/W(x, y, z), dv/W(x, y, z)).$$

From du and dv, the texture coordinates (u, v) are computed in the prior art.

A problem associated with the above described prior art second order perspective texture mapping technique is that it is costly to implement in terms of processor time and integrated circuit real estate due to the repetitive divide operation. Divide operations are computationally expensive. Thus a need exists for a second order perspective texture mapping apparatus which is not costly to implement in terms of processor time and integrated circuit real estate. What is needed further is an apparatus for second order perspective texture mapping that eliminates the repetitive division operation required by prior art texture mapping techniques.

Accordingly, the present invention provides a set of input parameters that are used by a texture mapping processing capable of performing second order texture mapping operations without the need of a costly repetitive divide operation. These and other advantages of the present invention not described above will become clear in view of the following detailed description of the present invention.

SUMMARY OF THE INVENTION

The present invention includes a method for computing input parameters used in a non-homogeneous second order perspective texture mapping process using interpolation. The present invention receives a polygon primitive (e.g., triangle) including screen display coordinates and texture map coordinates for each vertex (vmin, vmid, and vmax). Based on vertex information including perspective weights, w, screen display coordinates and texture map coordinates are determined for midpoints (i and j) of the two triangle slopes opposite the triangle's major slope. Based on a determined quadratic equation of the triangle's major slope, screen coordinates and texture map coordinates are determined at several selected points (e.g., imain, jmain, and midmain) along the major slope that corresponds to the i, j, and vmid points. From these values, quadratic coefficients a1, a2, and du_ortho_add are computed and also quadratic coefficients b1, b2 and dv_ortho_add are computed. The above values, parameters u_main, du_main (change in u over change in y), d2u_main (change in Δu over change in Δy), du_ortho (change in u over change in x), d2u_ortho (change in Δu over change in Δx), v_main, dv_main (change in v over change in y), d2v_main (change in Δv over change in Δy), dv_ortho (change in v over change in x), and d2v_ortho (change in Δv over change in Δx) are computed and forwarded to a specialized non-homogenous second order perspective texture mapping process using interpolation. The above texture mapping process is extremely efficient as it is free of division operations during the interpolation. Using the interpolation process, a texture-mapped polygon having second order perspective can be efficiently rendered for display.

Specifically, in a computer controlled graphics display system, an embodiment includes a method of determining input parameters comprising the computer implemented steps of: a) accessing a triangle primitive, from computer memory, representing an image for physical display in (x, y) coordinates on a screen, the triangle primitive having a minimum vertex, a middle vertex, and a maximum vertex; b) solving coefficients a1main and a2main for a first quadratic expression representing texel coordinate values (u, v) over a major slope of the polygon from the minimum vertex to the maximum vertex in a y dimension; c) based on step b), solving for the parameter du_main=a1main+a2main and the parameter d2u_main=2*a2main, wherein du_main is the rate of change of u over y and d2u_main is the rate of change of du_main over y; d) solving u_main being equal to the u coordinate of the minimum vertex; e) solving a set of relationships comprising a set of quadratic relationships each representing texel coordinate values over a scan line within the triangle to obtain a first coefficient, a1, a second coefficient, a2 and a parameter du_ortho_add; f) solving for the parameter du_ortho=a2+(a1−i(y)*du_ortho_add) and the parameter d2u_ortho=2*a2, wherein du_ortho is the rate of change of u over x and d2u_ortho is the rate of change of du_ortho over x; and g) supplying u_main, du_main, d2u_main, du_ortho, d2u_ortho, and du_ortho_add to an interpolation driven second order texture mapping process.

BRIEF DESCRIPTION OF THE DRAWINGS

FIG. 1A represents a texture map image in a texture map memory space.

FIG. 1B represents a display screen and display object.

FIG. 2A is a prior art linear sampling path for sampling an image stored in a texture map.

FIG. 2B is a prior art homogenous 2nd order perspective sampling path for sampling an image stored in a texture map.

FIG. 2C is a prior art non-homogenous 2nd order perspective sampling path for sampling an image stored in a texture map.

DESCRIPTION OF THE PREFERRED EMBODIMENTS

In the following detailed description of the present invention, numerous specific details are set forth in order to provide a thorough understanding of the present invention. However, it will be obvious to one skilled in the art that the present invention may be practiced without these specific details or by using alternate elements or methods. In other instances well known methods, procedures, components, and circuits have not been described in detail as not to unnecessarily obscure aspects of the present invention.

Notation and Nomenclature

Some portions of the detailed descriptions which follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "processing" or "computing" or "calculating" or "determining" or "displaying" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission or display devices.

Computer System Platform

Figure 3:
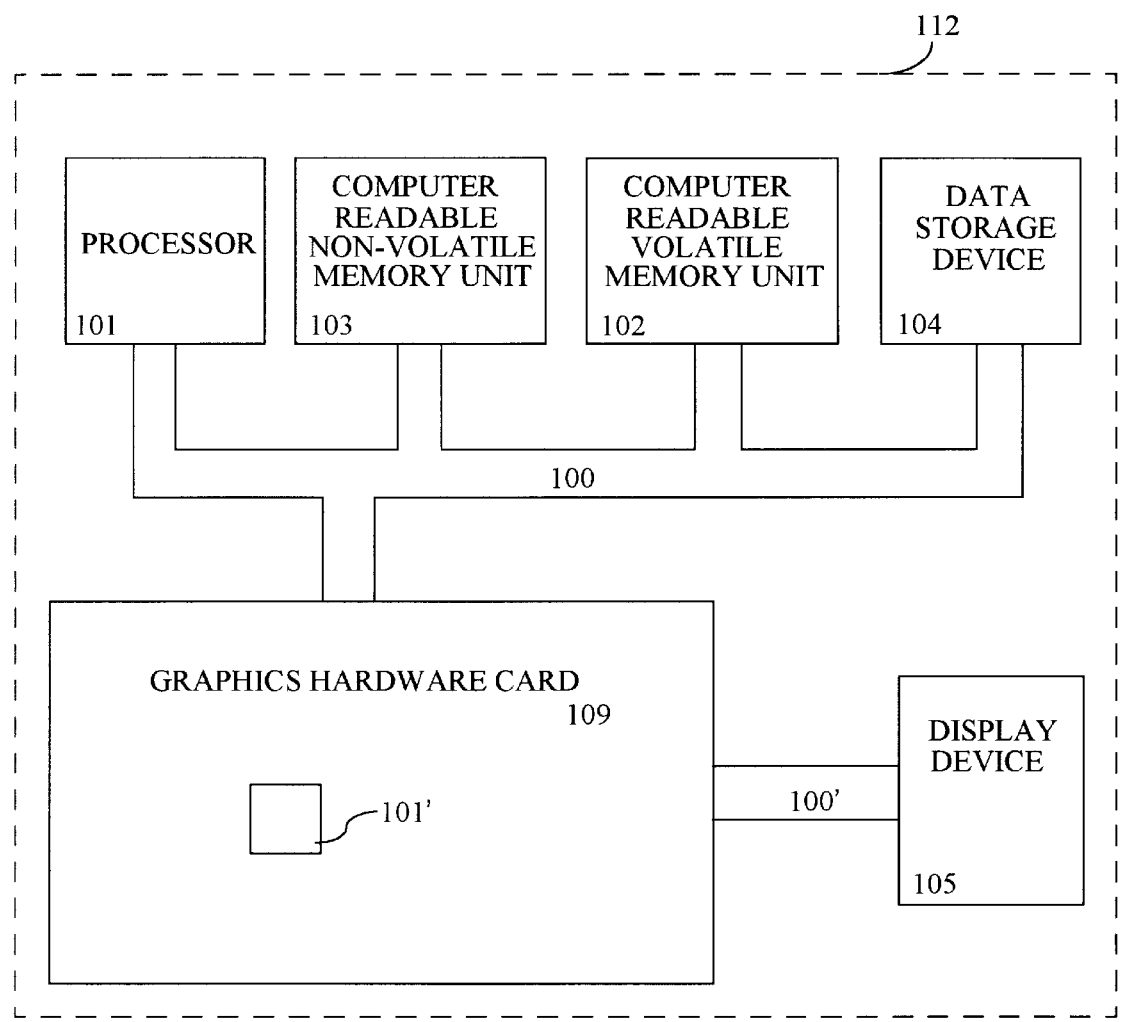
FIG. 3 is an exemplary general purpose host computer system used in accordance with the methods of the present invention parameter determination processes.

Refer to FIG. 3 which illustrates a computer system 112. Within the following discussions of the present invention, certain processes (e.g., processes 200 and 300) and steps are discussed that are realized, in one implementation, as a series of instructions (e.g., software program) that reside within computer readable memory units of system 112 and executed by processors of system 112. When executed, the instructions cause the computer system 112 to perform specific actions and exhibit specific behavior which is described in detail to follow.

In general, computer system 112 used by the present invention comprises an address/data bus 100 for communicating information, one or more central processors 101 coupled with the bus 100 for processing information and instructions, a computer readable volatile memory unit 2 (e.g., random access memory, static RAM, dynamic, RAM, etc.) coupled with the bus 100 for storing information and instructions for the central processor(s) 101, a computer readable non-volatile memory unit (e.g., read only memory, programmable ROM, flash memory, EPROM, EEPROM, etc.) coupled with the bus 100 for storing static information and instructions for the processor(s) 101. System 112 also includes a mass storage computer readable data storage device 4 (hard drive or floppy) such as a magnetic or optical disk and disk drive coupled with the bus 100 for storing information and instructions. Optionally, system 112 can include a display device 5 for displaying information to the computer user, an optional alphanumeric input device 6 including alphanumeric and function keys coupled to the bus 100 for communicating information and command selections to the central processor(s) 101, an optional cursor control device 107 coupled to the bus for communicating user input information and command selections to the central processor(s) 101, and an optional signal generating device 108 coupled to the bus 100 for communicating command selections to the processor(s) 101. In one exemplary implementation, system 112 is an x86 microprocessor based computer system, but could equally be of a number of other various well known and commercially available platforms.

The host system 112 provides data and control signals via bus 100 to a graphics hardware unit ("card") 109. The graphics hardware card 109 typically contains a display processor 110' which executes a series of display instructions found within a display list. The display processor 110' supplies data and control signals to a frame buffer (not shown) which refreshes the display device 105 for rendering images (including graphics images).

Input Parameter Determination of the Present Invention for the General Triangle Case An second order perspective texture mapping procedure using interpolation is described in detail in copending patent application entitled Non-Homogenous Second Order Perspective Texture Mapping Using Linear Interpolation Parameters, filed on Dec. 30, 1996, Ser. No. 08/774,787, now U.S. Pat. No. 5,835,097, assigned to the assignee of the present invention. The texture mapping interpolation of the above referenced patent application requires particular input parameters for the u texture map coordinate: u_main; du_main; du_ortho; d2u_ortho; d2u_main; and du_ortho_add and for the v texture map coordinate there are: v_main; dv_main; dv_ortho; d2v_ortho; d2v_main; and dv_ortho_add. As used with respect to the interpolation process, u_main and v_main are the initial u and v coordinates for the initial starting point for a sample triangle graphics primitive.

Figure 4:
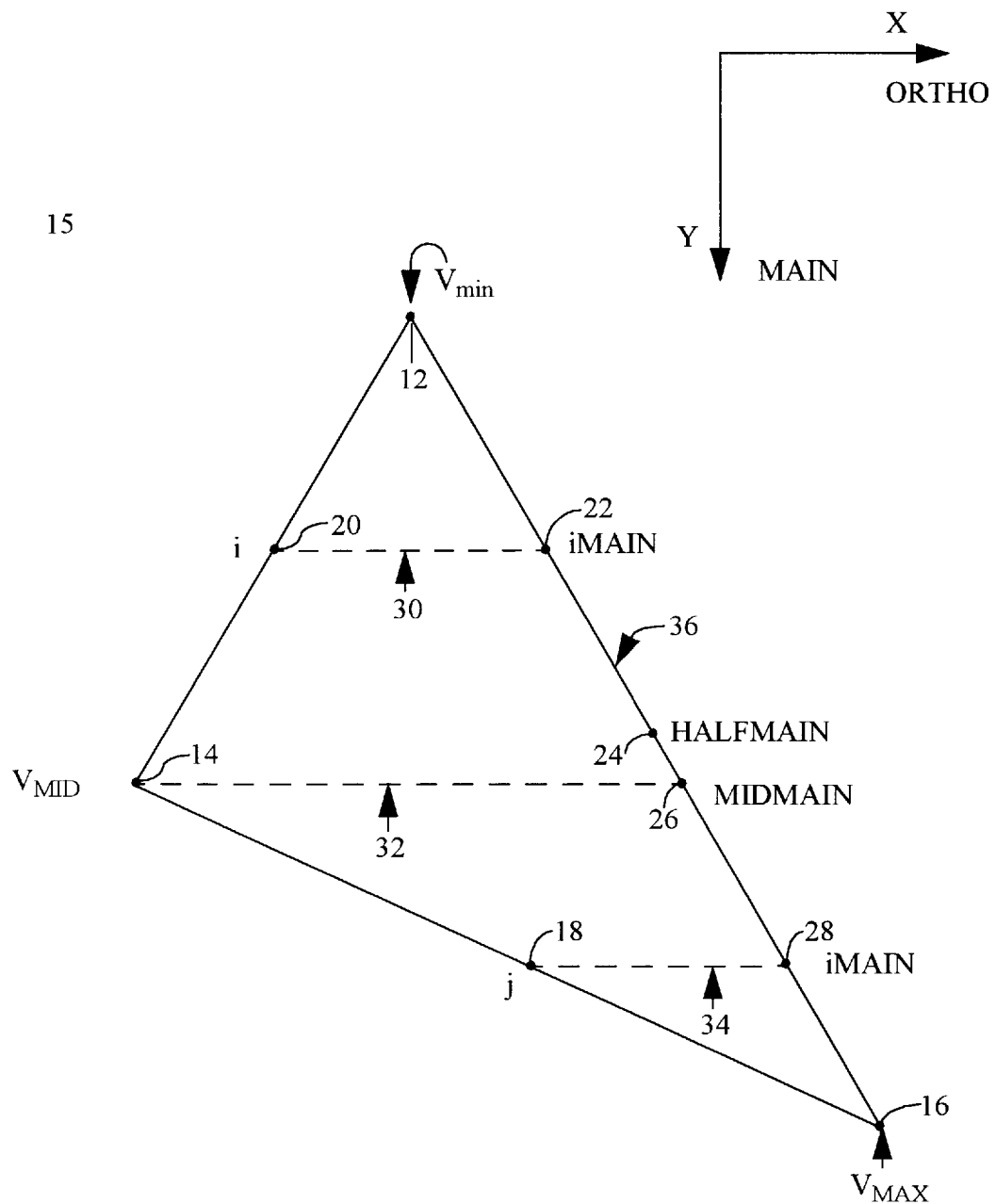
FIG. 4 is an illustration of a sample polygon with identified points and scan lines used in accordance with the present invention.

An exemplary triangle graphics primitive 15 used in accordance with the present invention is shown in FIG. 4. Coordinates within the triangle are referred to as "pixels." As oriented, a major slope 36 exists from the vmin 12 vertex (top) to the vmax vertex 16 (bottom). During the rendering process, horizontal scan lines are processed, pixel by pixel, starting with the pixel along the major slope 36 and, in this case, traversing left within the triangle 15. The horizontal scan lines are sequentially processed from the top to the bottom of triangle 15 traversing in the vertical direction. The horizontal dimension is referred to herein as the x axis or "ortho" direction and the vertical direction is referred to herein as the y axis or "main" direction. In view of the foregoing, u_main and v_main represent the texel coordinates corresponding to the pixel coordinates at the vmin vertex 12, where the rendering process commences for triangle 15.

The parameters du_main and dv_main represent the amount of change in u and v, respectively, for each incremental change in y ($\Delta y$) as triangle 15 is being rendered. For a given scan line (e.g., 30), du_main and dv_main are therefore constant since $\Delta y$ is zero. The parameters d2u_main and d2v_main represent the amount of change du_main and dv_main, respectively, for a given change in y during the rendering process. The parameters du_ortho and dv_ortho represent the amount of change in u and v, respectively, for each incremental change in x ($\Delta x$) as triangle 15 is being rendered. For a given scan line (e.g., 30), du_ortho and dv_ortho change for each pixel of the scan line since $\Delta x$ is not zero. The parameters d2u_ortho and d2v_ortho represent the amount of change du_ortho and dv_ortho, respectively, for a given change in x during the rendering process.

The parameter du_ortho_add is a special offset value to the u starting coordinate for a given scan line and is based on the scan line's y coordinate. Although it is updated along the y coordinate, it is called an "ortho" parameter because it performs an "x" offset by taking into consideration a triangle's edge moving across the x dimension for the first pixel of each successive horizontal scan line. Therefore, the parameter dv_ortho_add is a special offset value (in the x direction) to the v coordinate for a given scan line and is based on the scan line's y coordinate. The manner in which the above parameters are used is explained in detail in the above referenced patent application, incorporated herein by reference.

The following discussion explains the manner in which the above parameters is computed in accordance with the present invention. Before these processes are discussed, certain terminology regarding sample triangle 15 of FIG. 4 is presented.

FIG. 4 illustrates a sample polygon triangle primitive 15 containing three vertices: vmin 12, vmid 14, and vmax 16. Each vertex contains its own x,y screen position (e.g., vmax(x,y), vmid(x,y), and vmin(x,y), a corresponding u,v coordinate (e.g., vmax(u,v), vmid(u,v), and vmin(u,v)) and a perspective weight value w (e.g., vmax(w), vmid(w), and vmin(w)). The main slope 36 runs from vmin 12 to vmax 16. The mid point i 20 is the middle of the edge spanning from vmin 12 to vmid14. The mid point j 18 is the middle of the edge spanning from vmid14 to vmax 16. The point imain 22 is the point along major slope 36 having the same y coordinate as i 20. The point midmain 26 is the point along major slope 36 having the same y coordinate as vmid 14. The point jmain 28 is the point along major slope 36 having the same y coordinate as j 18. Scan lines 30, 32, and 34 are also shown corresponding to i 20, vmid 14, and j 18, respectively. Point 24 is the halfmain point and represents the middle of the major slope 36.

The value Δxi is the change in x from i 20 to imain 22. The value Δxmid is the change in x from vmid 14 to midmain 26. The value Δxj is the change in x from j 18 to jmain 28. The value Δymin-i is the change in y from vmin 12 to i 20. The value Δyi-mid is the change in y from i 20 to vmid 14. The value Δymid-j is the change in y from vmid 14 to j 18. The value Δyj-max is the change in y from j 18 to vmax 16. The value Δyi-j is the change in y from i 20 to j 18.

Figure 5:
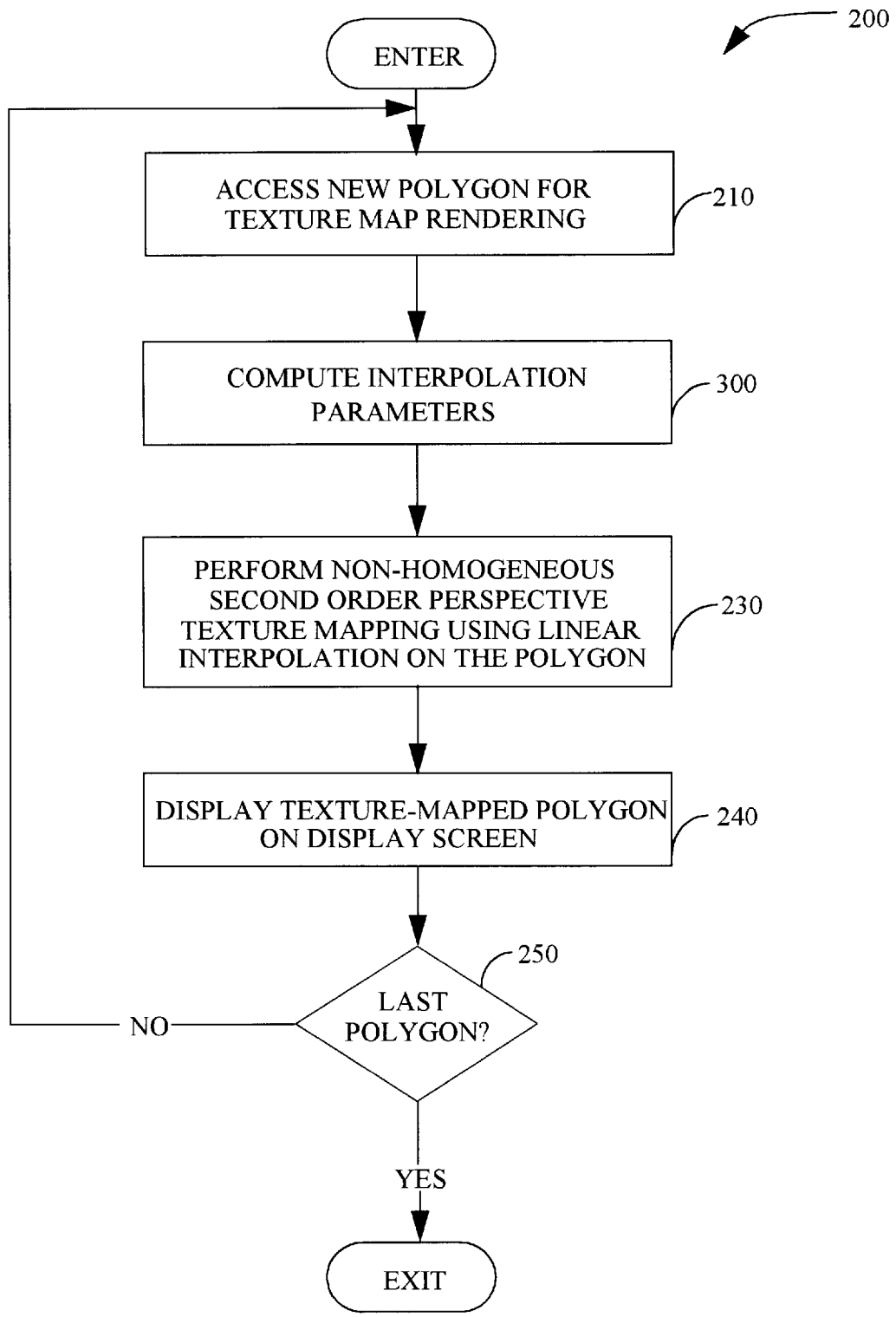
FIG. 5 is a high level flow diagram illustrating steps performed by the present invention in order to render a second order perspective texture mapped polygon in a computer controlled display system.

FIG. 5 illustrates a high level polygon rendering process 200 used in accordance with the present invention. Steps of FIG. 5 are implemented as program code stored within computer readable memory units of system 1 12 and executed over processor 101 and/or processor 101' (FIG. 3). At step 210, a new polygon is accessed from computer memory (e.g., memory 104) for rendering and is referred to herein as the selected polygon. For instance, triangle 15 is accessed at step 210. The x, y, u, v, and w values for each of the three vertices of the selected triangle 15 (vmin, vmid, and vmax) are given at step 210. Also at step 210, an identification of which texture map (e.g., which surface image) to use for the selected triangle 15 is given.

At step 300, the present invention computes the following parameters for the selected polygon: u_main; du_main; du_ortho; d2u_ortho; d2u_main; and du_ortho_add, v_main; dv_main; dv_ortho; d2v_ortho; d2v_main; and dv_ortho_add. The manner in which the present invention computes these parameters is explained with respect to FIG. 6 and FIG. 7. These parameters are then forwarded to step 230 which performs non-homogenous second order perspective texture mapping using interpolation.

This process 230 is described in the above referenced patent application. During process 230, the triangle is rendered on the display screen one horizontal scan line at a time starting from vmin 12 and ending at vmax 16 (FIG. 4). The horizontal scan line starts with the pixel along the major slope 36 and completes on the triangle's opposite edge. The parameters u_main and v_main identify the texel coordinates (u,v) for the vmin point 12. At step 230, the following equation is used to identify the texel coordinates (u,v) for each pixel (0,n) of a scan line located on the main slope 36 (e.g., the first pixel of each horizontal scan line). With (m,n) notation, m is associated with the x screen dimension and n is associated with the y screen dimension.

$u(0,n)=u(0,n-1)+du\_\text{main}+(n-1)*d2u\_\text{main}$ for $m=0$ $v(0,n)=v(0,n-1)+dv\_\text{main}+(n-1)*d2v\_\text{main}$ for $m=0$ For a given horizontal scan line, process 230 performs the following procedure to compute the texel coordinates (u,v) for each pixel of the scan line located on a constant n value:

$u(m,n)=u(m-1,n)+du\_\text{ortho}(n)+(m-1)*d2u\_\text{ortho}$ for each $m>0$ $v(m,n)=v(m-1,n)+dv\_\text{ortho}(n)+(m-1)*d2v\_\text{ortho}$ for each $m>0$.

where for each scan line:

$du\_\text{ortho}(n)=n*du\_\text{ortho\_add}+du\_\text{ortho}$ $dv\_\text{ortho}(n)=n*dv\_\text{ortho\_add}+dv\_\text{ortho}$.

And at the start of process 230, the following relationships initialize the values wherein:

$u(0,0)=u\_\text{main}$ $v(0,0)=v\_\text{man}$.

Process 230 uses interpolation, rather than perspective division operations, to efficiently compute the proper texel coordinates. At the completion of step 230, the selected triangle is completely texture mapped with perspective. At step 240, the selected triangle is rendered as a physical image on the display screen (e.g., unit 105).

At step 250 of FIG. 5, the present invention checks if the last polygon of the display list has been selected and rendered. If not, processing returns to step 210 with a newly selected polygon for processing as described above. If the last polygon has been processed at step 250, process 200 ends.

Process 300 of the present invention is explained with reference to FIG. 6, FIG. 7 and FIG. 4. Process 300 is implemented as program code stored in computer readable memory units of system 112 and is executed over processor 101 and/or 101'. At step 310, the present invention determines a quadratic equation representing the path through the identified texture map, e.g., T(u,v), corresponding to the main slope 36. This quadratic equation for u and v are shown below as relationships (2) and (3), respectively:

$$a1\text{main}*y+a2\text{main}*y^2+v\text{min}(u)=u \qquad (2)$$

$$b1\text{main}*y+b2\text{main}*y^2+v\text{min}(v)=v \qquad (3)$$

The above coefficients a1main and a2main and b1main and b2main are computed according to the following procedures. The slope Δx/Δy of the major slope 36 is a value obtained from the different in the x and y coordinates from vmin to vmax and is computed at step 310. The x and y coordinates of vmid and vmax are specified relative to vmin, so vmin(x) and vmin(y) are implicitly 0. Specifically, the slope is determined by relationship (4).

$$\Delta x/\Delta y=[v\text{max}(x)]/[v\text{max}(y)] \qquad (4)$$

The following coefficients are then computed:

$$u1 = \left[ \frac{v\text{min}(u) * v\text{max}(w) + v\text{max}(u) * v\text{min}(w)}{v\text{min}(w) + v\text{max}(w)} \right] \qquad (5)$$

-continued $$v1 = \left[ \frac{vmin(v) * vmax(w) + vmax(v) * vmin(w)}{vmin(w) + vmax(w)} \right] \quad (6)$$

Then, the values for a1main and a2main and b1main and b2main are computed according to the below relationships:

$$a1main = [-3*vmin(u) + 4*u1 - vmax(u)] * \Delta x/\Delta y \quad (7)$$

$$a2main = [2*(vmin(u) - 2*u1 + vmax(u))] * (66 \; x/\Delta y)^2 \quad (8)$$

$$b1main = [-3*vmin(v) + 4*v1 - vmax(v)] * \Delta x/\Delta y \quad (9)$$

$$b2main = [2*(vmin(v) - 2*v1 + vmax(v))] * (\Delta x/\Delta y)^2 \quad (10)$$

Figure 6:
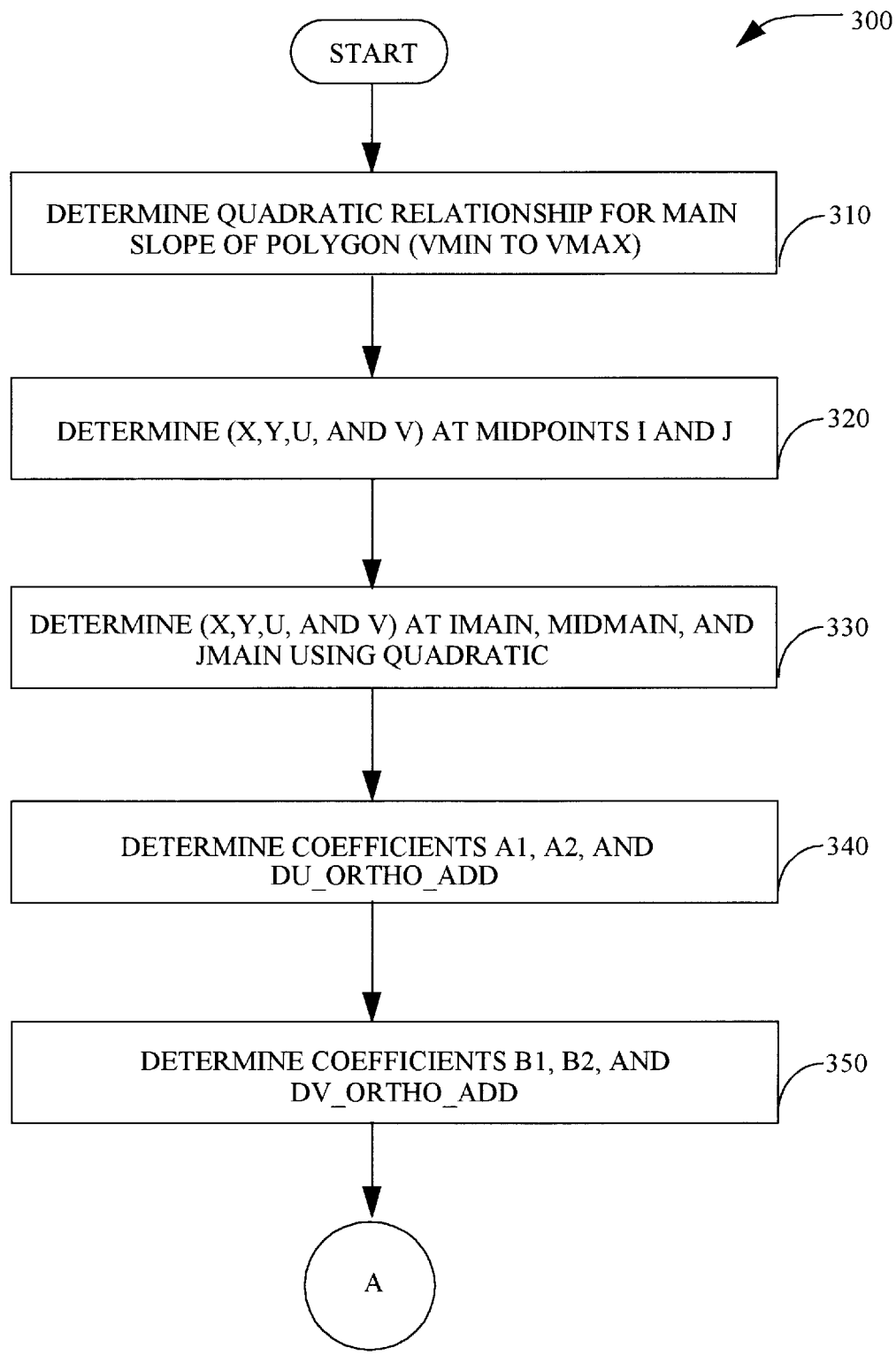
FIG. 6 illustrates steps of the present invention parameter determination processes.

At step 320 of FIG. 6, the present invention then determines x, y, u, and v at the midpoints: points i 20 and j 18. The values for i 20 are called i(x), i(y), i(u) and i(v). The values for j 18 are called j(x), j(y), j(u) and j(v). The relationships used by the present invention at step 320 are shown below:

$$i(y) = vmid(y)/2 \quad (11a)$$

$$i(x) = [vmid(x)]/2 \quad (11b)$$

$$i(u) = \left[ \frac{vmin(u) * vmid(w) + vmid(u) * vmin(w)}{vmin(w) + vmid(w)} \right] \quad (12)$$

$$i(v) = \left[ \frac{vmin(v) * vmid(w) + vmid(v) * vmin(w)}{vmin(w) + vmid(w)} \right] \quad (13)$$

$$j(y) = [vmax(y) + vmid(y)]/2 \quad (14a)$$

$$j(x) = [vmax(x) + vmid(x)]/2 \quad (14b)$$

$$j(u) = \left[ \frac{vmid(u) * vmax(w) + vmax(u) * vmid(w)}{vmax(w) + vmid(w)} \right] \quad (15)$$

$$i(v) = \left[ \frac{vmid)v * vmax(w) + vmax(v) * vmid(w)}{vmax(w) + vmid(w)} \right] \quad (16)$$

At step 330 of FIG. 6, x, y, u, and v are determined for points imain 22, jmain 28 and also midmain 26 along the major slope 36 using the solved quadratic equation computed in step 310. The values for imain are called imain(x), imain(y), imain(u) and imain(v). The values for jmain are called jmain(x), jmain(y), jmain(u) and jmain(v). The values for midmain are called midmain(x), midmain(y), midmain (u) and midmain(v). The relationships used by the present invention at step 330 are shown below:

$$imain(u) = a2main * i(y)^2 + a1main * i(y) + vmin(u) \quad (17)$$

$$imain(v) = b2main * i(y)^2 + b1main * i(y) + vmin(v) \quad (18)$$

$$jmain(u) = a2main * j(y)^2 + a1main * j(y) + vmin(u) \quad (19)$$

$$jmain(v) = b2main * j(y)^2 + b1main * j(y) + vmin(v) \quad (20)$$

It is appreciated that once the slope $\Delta x/\Delta y$ of major slope 36 is known and the x and y coordinates of vmin and vmax are given, using well known methods the x and y coordinates can readily be computed for imain 22, midmain 26 and jmain 28 given the known coordinates for i 20, vmid 14 and j 18. These computations are performed at step 330 using the relationships below:

$$imain(y) = i(y) \quad (21a)$$

$$imain(x) = [imain(y)/(\Delta x/\Delta y)] \quad (21b)$$

$$jmain(y) = j(y) \quad (21c)$$

$$jmain(x) = [jmain(y)/(\Delta x/\Delta y)] \quad (21d)$$

$$midmain(y) = vmid(y) \quad (21e)$$

$$midmain(x) = [midmain(y)/(\Delta x/\Delta y)] \quad (21f)$$

At step 340, the present invention identifies the following three quadratic relationships regarding the texture paths for scan line 30, scan line 32 and scan line 34 for the u coordinate:

$$a1i*\Delta xi + a2*\Delta xi^2 + imain(u) = i(u) \quad (22a)$$

$$a1mid*\Delta xmid + a2*\Delta xmid^2 + midmain(u) = mid(u) \quad (22b)$$

$$a1j*\Delta xi + a2*\Delta xj^2 + jmain(u) = j(u) \quad (22c)$$

where relationship (22a) corresponds to scan line 30, relationship (22b) corresponds to scan line 32, and relationship (22c) corresponds to scan line 34. These equations introduce four unknown coefficients: a1i, a1j, a1mid and a2.

The present invention also introduces the following two equations that introduce only one new unknown value, du_ortho_add:

$$a1i + [\Delta yi-mid * du\_ortho\_add] = a1mid \quad (22e)$$

$$a1i + [\Delta yi-j * du\_ortho\_add] = a1j \quad (22f)$$

where $\Delta yi-mid$ is the difference in y from i 20 to Vmid 14 and $\Delta yi-j$ is the difference in y from i 20 to j 18. With five equations and five unknowns, the present invention at step 340 determines a relationship for a1i (simply called a1 below):

$$a1 = \left[ \frac{-\Delta umid + 4 * \Delta ui + 2 * (vmid(y)/vmax(y)) * (\Delta uj - \Delta ui)}{\Delta xmid} \right] \quad (23)$$

where $\Delta umid$ is the difference in u from vmid 14 to midmain 26 along scan line 32, $\Delta ui$ is the difference in u from i 20 to imain 22 along scan line 30 and $\Delta uj$ is the difference in u from j 18 to jmain 28 along scan line 34. The value $\Delta xmid$ is the difference in x from vmid 14 to midmain 26. At step 340, the relationship for a2 is expressed below:

$$a2 = \left[ \frac{4 * \Delta ui}{\Delta xmid^2} - \frac{2 * a1}{\Delta xmid} \right] \quad (24)$$

At step 340, the relationship for du_ortho_add is expressed as:

$$du\_ortho\_add = \left[ \frac{(4/\Delta xmid) * (\Delta uj - \Delta u)}{vmax(y)} \right] \quad (25)$$

At step 350 of FIG. 6, set of five relationships similar to (22a)–(22e), above, are used but v is used instead of u in order to determine b1, b2, and dv_ortho_add. These relationships are shown below:

$$b1i*\Delta xi + b2*\Delta xi^2 + imain(v) = i(v) \quad (26a)$$

$$b1mid*\Delta xmid + b2*\Delta xmid^2 + midmain(v) = mid(v) \quad (26b)$$

$$b1j*\Delta xi + b2*\Delta xj^2 + jmain(v) = j(v) \quad (26c)$$

$$b1i + [\Delta yi-mid * dv\_ortho\_add] = b1mid \quad (26e)$$

$$b1i + [\Delta yi-j * dv\_ortho\_add] = b1j \quad (26f)$$

With five equations and five unknowns, the present invention at step 350 determines a relationship for b1i (simply called b1 below):

$$b1 = \left[ \frac{-\Delta vmid + 4 * \Delta vi + 2 * (vmid(y)/vmax(y)) * (\Delta vj - \Delta vi)}{\Delta xmid} \right] \quad (27)$$

where $\Delta vmid$ is the difference in v from vmid 14 to midmain 26 along scan line 32, $\Delta vi$ is the difference in v from i 20 to imain 22 along scan line 30 and $\Delta vj$ is the difference in v from j 18 to jmain 28 along scan line 34. The value $\Delta xmid$ is the difference in x from vmid 14 to midmain 26. At step 350, the relationship for b2 is expressed below:

$$b2 = \left[ \frac{4 * \Delta vi}{\Delta xmid^2} - \frac{2 * b1}{\Delta xmid} \right] \quad (28)$$

At step 340, the relationship for dv_ortho_add is expressed as:

$$dv\_ortho\_add = \left[ \frac{(4/\Delta xmid) * (\Delta vj - \Delta v)}{vmax(y)} \right] \quad (29)$$

Figure 7:
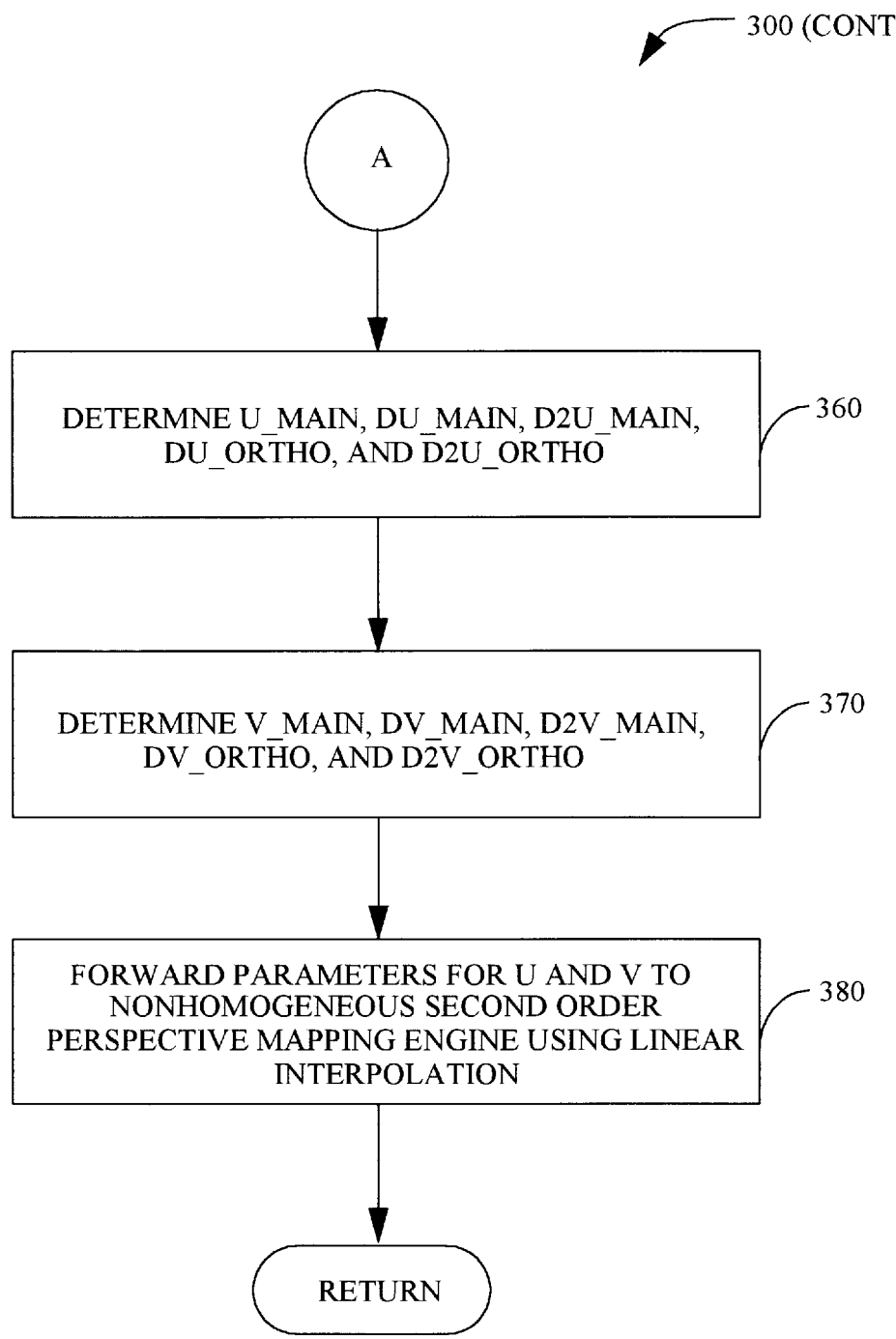
FIG. 7 illustrates further steps of the present invention parameter determination processes.

At step 360 of FIG. 7, the present invention determines the parameters: u_main, du_main, d2u_main, du_ortho, and d2u_ortho. The value of u_main is the value of u at vmin 12. The parameters du_main and d2u_main are computed based on the coefficients of the quadratic of step 310 as:

$$du\_main = a1main + a2main \quad (30a)$$

$$d2u\_main = 2*a2main \quad (30b)$$

The values for a1main and a2main are determined by relationships (7) and (8) above. At step 360, the parameter du_ortho is computed by:

$$du\_ortho = a2 + (a1-i(y) * du\_ortho\_add) \quad (31)$$

$$d2u\_ortho = 2*a2 \quad (32)$$

At step 370 of FIG. 7, the present invention determines the parameters: v_main, dv_main, d2v_main, dv_ortho, and d2v_ortho. The value of v_main is the value of v at vmin 12. The parameters dv_main and d2v_main are computed based on the coefficients of the quadratic of step 310 as:

$$dv\_main = b1main + b2main \quad (33a)$$

$$d2v\_main = 2*b2main \quad (33b)$$

The values for b1main and b2main are determined by relationships (9) and (10) above. At step 370, the parameters dv_ortho and d2v_ortho are computed by:

$$dv\_ortho = b2 + (b1-i(y) * dv\_ortho\_add) \quad (34)$$

$$d2v\_ortho = 2*b2 \quad (35)$$

At step 380, the parameters for u and v are forwarded to the non-homogenous second order perspective mapping process using linear interpolation. This process is described as step 230 herein. Step 380 forwards the parameters shown in Table I below.

TABLE I

| For Coordinate (u) | For Coordinate (v) |
|---|---|
| u_main | v_main |
| du_main | dv_main |
| d2u_main | d2v_main |
| du_ortho | dv_ortho |
| d2u_ortho | d2v_ortho |
| du_ortho_add | dv_ortho_add |

SPECIAL CASES

The below discussion describes certain special cases for flat bottom triangles and flat top triangles. In one embodiment of the present invention, when process 200 determines that the triangle received at step 210 (FIG. 5) is either a flat top triangle or a flat bottom triangle, the steps of process 300 are modified slightly according to the below discussion so that the specially identified triangles can be efficiently processed. Process 200 recognizes a flat bottom triangle when vmid(y)=vmax(y) and a flat top triangle is recognized when vmid(y)=vmin(y).

Figure 8A:
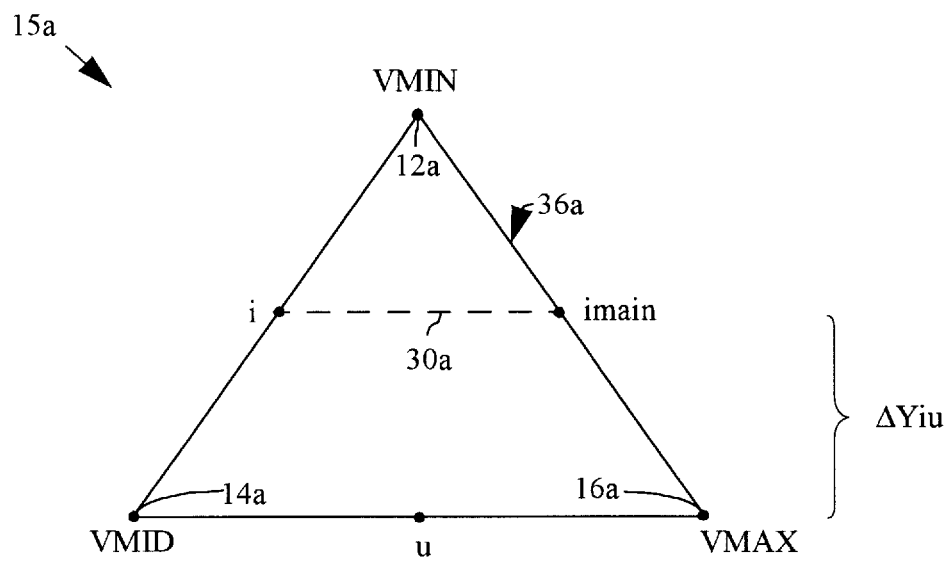
FIG. 8A illustrates a flat bottom triangle graphics primitive used in one embodiment of the present invention parameter determination process.

FIG. 8A illustrates a special case triangle 15a having a flat bottom. This is a variant of the general case described above with respect to process 300. The flat bottom triangle 15a has the y coordinate of vmid 14a equal to the y coordinate of vmax 16a. The point u is located in the middle of the scan line from vmid 14a to vmax 16a. In a manner analogous to process 300, the quadratic equation describing the main slope 36a can be expressed in terms of coefficients a1main and a2main for u and b1main and b2main for v. These terms are discovered by the present invention for the flat bottom triangle 15a using the process described above. From the relationships of FIG. 8A the following expressions are determined by the present invention ("mm"=vmid to vmax):

$$a2*\Delta xi^2 + a1i*\Delta xi + imain(u) = i(u) \quad (36)$$

$$a2*\Delta xmm^2 + a1mm*\Delta xmm + vmax(u) = vmid(u) \quad (37)$$

$$a1mm = a1i + (\Delta yiu * du\_ortho\_add) \quad (38)$$

where expression (36) relates to scan line 30a and expression (37) relates to the bottom scan line containing vmid 14a, u, and vmax 16a. The value $\Delta yiu$ is the y coordinate difference from scan line 30a to vmax 16a. The values for a2 and a1mm are obtained by the present invention from the quadratic polynomial (37) because the values for u are given by the vertices of the triangle 15a. From (38) the below expression is determined where:

$$a1i = a1mm - (\Delta yiu * du\_ortho\_add) \quad (39)$$

By substituting expression (39) into expression (36), the following expression is determined:

$$du\_ortho\_add = \left[ \frac{-\Delta ui + a2 * \Delta xi^2 + a1mm * \Delta xi}{\Delta yiu * \Delta xi} \right] \quad (40)$$

From the above, the value of a1i can be determined by substituting the value of du_ortho_add into (39). The remainder of the parameters for u are then computed using the same methods as described with respect to process 300. The parameter values for v with respect to the flat bottom triangle 15a are computed using the below equations:

$$b2*\Delta xi^2+b1i*\Delta xi+i\text{main}(v)=i(v) \tag{41}$$

$$b2*\Delta xmm^2+b1mm*\Delta xmm+v\text{max}(v)=v\text{mid}(v) \tag{42}$$

$$b1mm=b1i+(\Delta yiu * dv\_ortho\_add) \tag{43}$$

$$b1i=b1mm-(\Delta yiu * dv\_ortho\_add) \tag{44}$$

$$dv\_ortho\_add = \left[\frac{-\Delta vi + b2 * \Delta xi^2 + b1mm * \Delta xi}{\Delta yiu * \Delta xi}\right] \tag{45}$$

The values for the v parameters are solved in the same manner as described above with respect to the u parameters.

The determined parameter values for u and v are then given to process 230 (FIG. 5) for texture map rendering of triangle 15*a*.

Figure 8B:
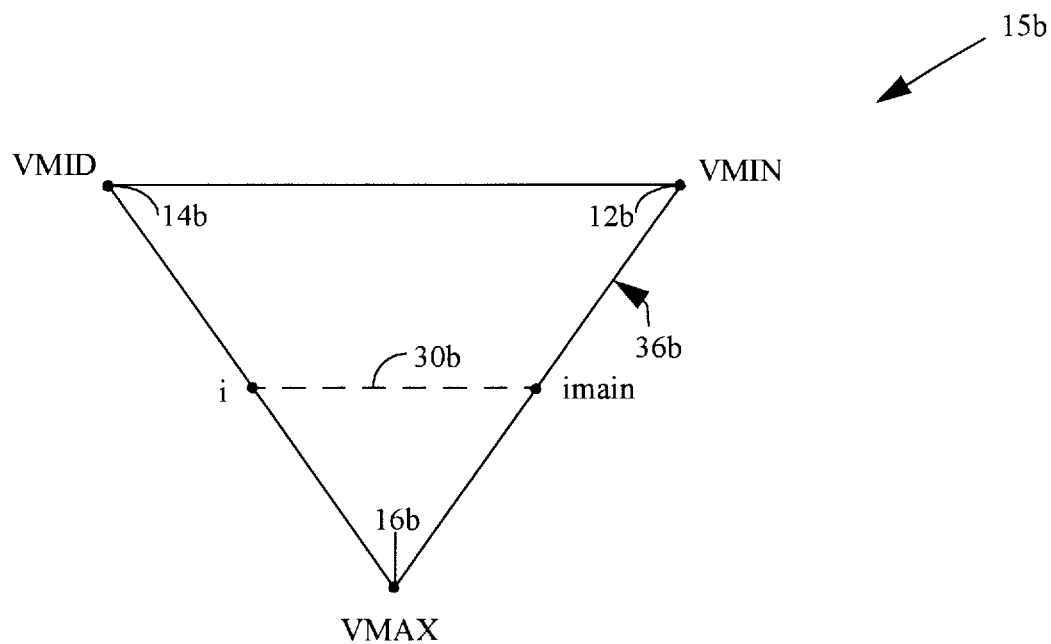
FIG. 8B illustrates a flat top triangle graphics primitive used in one embodiment of the present invention parameter determination process.

FIG. 8B illustrates a special case triangle 15*b* having a flat top. This is a variant of the general case described above with respect to process 300. The flat top triangle 15*b* has the y coordinate of vmid 14*b* equal to the y coordinate of vmin 12*b*. In a manner analogous to process 300, the quadratic equation describing the main slope 36*b* can be expressed in terms of coefficients a1main and a2main for u and b1main and b2main for v. These terms are discovered by the present invention for the flat top triangle 15*b* using the process described above. From the relationships of FIG. 8B the following expressions are determined by the present invention ("mm" is vmid to vmin):

$$a2*\Delta xi^2+a1i*\Delta xi=i(u)-i\text{main}(u) \tag{46}$$

$$a2*\Delta xmm^2+a1mm*\Delta xmm=v\text{mid}(u)-v\text{max}(u) \tag{47}$$

$$a1i=a1+(\Delta yi * du\_ortho\_add) \tag{48}$$

where expression (46) relates to scan line 30*b* and expression (47) relates to the top scan line containing vmid 14*b* and vmin 12*b* and a1mm is called a1. The values for a2 and a1mm are obtained by the present invention from direct solution of the quadratic polynomial (47) because the values for u are given by the vertices of the triangle 15*b*. By substituting expression (48) into (46) the following expression is determined:

$$du\_ortho\_add = \left[\frac{\Delta ui - a2 * \Delta xi^2 - a1 * \Delta xi}{\Delta yi * \Delta xi}\right] \tag{49}$$

From the above, the value of a1i can be determined by substituting the value of du_ortho_add into (48). The remainder of the parameters for u are then computed using the same methods as described with respect to process 300. The parameter values for v with respect to the flat bottom triangle 15*b* are computed using the below equations:

$$b2*\Delta xi^2+b1i*\Delta xi=i(v)-i\text{main}(v) \tag{50}$$

$$b2*\Delta xmm^2+b1mm*\Delta xmm=v\text{mid}(v)-v\text{max}(v) \tag{51}$$

$$b1i=b1+(\Delta yi * dv\_ortho\_add) \tag{52}$$

$$dv\_ortho\_add = \left[\frac{\Delta vi - b2* \Delta xi^2 - b1 * \Delta xi}{\Delta yi * \Delta xi}\right] \tag{53}$$

The determined parameter values for u and v are then given to process 230 (FIG. 5) for texture map rendering of triangle 15*b*.

The preferred embodiment of the present invention, a method for computing input parameters used in a non-homogeneous second order perspective texture mapping process using interpolation, is thus described. While the present invention has been described in particular embodiments, it should be appreciated that the present invention should not be construed as limited by such embodiments, but rather construed according to the below claims.

What is claimed is:

1. In a computer controlled graphics display system, a method of determining input parameters for driving a texture mapping procedure, said method comprising the computer implemented steps of:

a) accessing from memory a triangle primitive representing an image for physical display in (x, y) coordinates on a screen, said triangle primitive having a minimum vertex, a middle vertex, and a maximum vertex;

b) solving for coefficients of a first quadratic expression representing texel coordinate values (u) across a major slope of said triangle primitive from said minimum vertex to said maximum vertex;

c) based on step b), solving for the parameter du_main and the parameter d2u_main, wherein du_main is the rate of change of u over y and d2u_main is the rate of change of du_main over y;

d) assigning u_main equal to the u coordinate of said minimum vertex;

e) solving a set of relationships comprising a set of quadratic relationships each representing texel coordinate values across a scan line within said triangle primitive to obtain a first coefficient associated with one scan line, a second coefficient associated with all scan lines, and a parameter du_ortho_add;

f) based on said first and said second coefficients of said step e), solving for the parameter du_ortho and the parameter d2u_ortho, wherein du_ortho is the rate of change of u over x and d2u_ortho is the rate of change of du_ortho over x; and g) supplying u_main, du main, d2u_main, du ortho, d2u_ortho, and du_ortho_add to said texture mapping process.

2. A method as described in claim 1 further comprising the steps of:

b') solving for coefficients of a second quadratic expression representing texel coordinate values (v) over said major slope of said polygon from said minimum vertex to said maximum vertex;

c') based on said step b'), solving for the parameter dv_main and the parameter d2v_main, wherein dv_main is the rate of change of v over y and d2v_main is the rate of change of dv_main over y;

d') assigning v_main equal to the v coordinate of said minimum vertex;

e') solving a second set of relationships comprising a second set of quadratic relationships each representing texel coordinate values over a scan line within said triangle to obtain a third coefficient associated with one scan line and a fourth coefficient associated with all scan lines, and a parameter dv_ortho_add;

f') based on said third and said second coefficients of step e') solving for the parameter dv_ortho and the parameter d2v_ortho, wherein dv_ortho is the rate of change of v over x and d2v_ortho is the rate of change of dv_ortho over x; and g') supplying v_main, dv_main, d2v_main, dv_ortho, d2v_ortho, and dv_ortho_add to said texture mapping process.

3. A method as described in claim 2 wherein:

said coefficients of said step b) are a1main and a2main; du_main=a1main+a2main and d2u_main=2*a2main;

said first and second coefficients of said step e) are a1 and a2, respectively; and du_ortho=a2+(a1−i(y) * du_ortho_add) and d2u_ortho=2 * a2.

4. A method as described in claim 3 wherein said step e) solves for the following relationships for three horizontal scan lines within said triangle polygon:

$$a1i*\Delta xi+a2*\Delta xi^2+i\text{main}(u)=i(u); \quad (1)$$

$$a1\text{mid}*\Delta x\text{mid}+a2*\Delta x\text{mid}^2+\text{midmain}(u)=\text{mid}(u); \text{ and} \quad (2)$$

$$a1j*\Delta xi+a2*\Delta xj^2+j\text{main}(u)=j(u); \quad (3)$$

where relationship (1) corresponds to a horizontal scan line above said middle vertex including a point i, relationship (2) corresponds to a horizontal scan line including said middle vertex, and relationship (3) corresponds to horizontal scan line below said middle vertex including a point j.

5. A method as described in claim 4 wherein said step e) further solves for the following relationships:

$$a1i+[\Delta yi-\text{mid} * du\_ortho\_add]=a1\text{mid}; \text{ and}$$

$$a1i+[\Delta yi-j * du\_ortho\_add]=a1j.$$

6. A method as described in claim 3 wherein said step b) is performed by solving the following relationships:

$$a1\text{main}=[-3*v\min(u)+4*u1-v\max(u)]* \Delta x/\Delta y$$

$$a2\text{main}=[2*(v\min(u)-2*u1+v\max(u))]* (\Delta x/\Delta y)^2.$$

7. A method as described in claim 2 wherein:

said coefficients of said step b') are b1main and b2main;

dv_main=b1main+b2main and d2v_main=2*b2main;

said third and said fourth coefficients of said step e') are b1 and b2, respectively; and dv_ortho=b2+(b1−i(y) * dv_ortho_add) and d2v_ortho=2 * b2.

8. In a computer controlled graphics display system, a method of determining input parameters, said method comprising the computer implemented steps of:

a) accessing from computer memory a triangle representing an image for physical display in (x, y) screen coordinates said triangle having a minimum vertex, a middle vertex, and a maximum vertex;

b) solving for coefficients a1main and a2main of a first quadratic expression representing texel coordinate values (u) across a major slope of said triangle from said minimum vertex to said maximum vertex;

c) based on step b), solving for the parameter du_main= a1main+a2main and the parameter d2u_main= 2*a2main, wherein du_main is the rate of change of u over y and d2u_main is the rate of change of du_main over y;

d) assigning u_main equal to the u coordinate of said minimum vertex;

e) solving a set of relationships comprising a set of quadratic relationships each representing texel coordinate values over a scan line within said triangle to obtain a first coefficient, a1, a second coefficient, a2 and a parameter du_ortho_add;

f) solving for the parameter du_ortho=a2+(a1−i(y) * du_ortho_add) and the parameter d2u_ortho=2*a2, wherein du_ortho is the rate of change of u over x and d2u_ortho is the rate of change of du_ortho over x; and g) supplying u_main, du_main, d2u_main, du_ortho, d2u_ortho, and du_ortho_add to a texture mapping process.

9. A method as described in claim 8 wherein said texture mapping process is an interpolation driven second order texture mapping process.

10. A method as described in claim 9 further comprising the steps of:

performing steps b) through f) with respect to texel coordinates (v) using b1main and b2main coefficients and solving for v_main, dv_main, d2v_main, dv_ortho, d2v_ortho, and dv_ortho_add parameters; and supplying said v_main, dv_main, d2v_main, dv_ortho, d2v_ortho, and dv_ortho_add parameters to said interpolation driven second order texture mapping process.

11. A method as described in claim 9 wherein said step e) solves for the following relationships for three horizontal scan lines within said triangle polygon:

$$a1i*\Delta xi+a2*\Delta xi^2+i\text{main}(u)=i(u); \quad (1)$$

$$a1\text{mid}*\Delta x\text{mid}+a2*\Delta x\text{mid}^2+\text{midmain}(u)=\text{mid}(u); \text{ and} \quad (2)$$

$$a1j*\Delta xi+a2*\Delta xj^2+j\text{main}(u)=j(u); \quad (3)$$

where relationship (1) corresponds to a scan line above said middle vertex including a point i, relationship (2) corresponds to a scan line including said middle vertex, and relationship (3) corresponds to scan line below said middle vertex including a point j.

12. A method as described in claim 11 wherein said step e) further solves for the following relationships:

$$a1i+[\Delta yi-\text{mid} * du\_ortho\_add]=a1\text{mid}; \text{ and}$$

$$a1i+[\Delta yi-j * du\_ortho\_add]=a1j.$$

13. A method as described in claim 9 wherein said step b) is performed by solving the following relationships:

$$a1\text{main}=[-3*v\min(u)+4*u1-v\max(u)]* \Delta x/\Delta y$$

$$a2\text{main}=[2*(v\min(u)-2*u1+v\max(u))]* (\Delta x/\Delta y)^2.$$

14. A computer controlled graphics display system including a processor coupled to a bus and a computer readable memory device coupled to said bus, said memory device having instructions stored therein that when executed over said processor implements a method of determining input parameters, said method comprising the computer implemented steps of:

a) accessing from computer memory a triangle representing an image for physical display in (x, y) screen coordinates said triangle having a minimum vertex, a middle vertex, and a maximum vertex;

b) solving for coefficients a1main and a2main of a first quadratic expression representing texel coordinate values (u) across a major slope of said triangle from said minimum vertex to said maximum vertex;

c) based on step b), solving for the parameter du_main= a1main+a2main and the parameter d2u_main= 2*a2main, wherein du_main is the rate of change of u over y and d2u_main is the rate of change of du_main over y;

d) assigning u_main equal to the u coordinate of said minimum vertex;

e) solving a set of relationships comprising a set of quadratic relationships each representing texel coordinate values over a scan line within said triangle to obtain a first coefficient, a1, a second coefficient, a2 and a parameter du_ortho_add;

f) solving for the parameter du_ortho=a2+(a1−i(y) * du_ortho_add) and the parameter d2u_ortho=2*a2, wherein du_ortho is the rate of change of u over x and d2u_ortho is the rate of change of du_ortho over x; and g) supplying u_main, du_main, d2u_main, du_ortho, d2u_ortho, and du_ortho_add to a texture mapping process.

15. A computer system as described in claim 14 wherein said texture mapping process is an interpolation driven second order texture mapping process.

16. A computer system as described in claim 15 wherein said method further comprises the steps of:

performing steps b) through f) with respect to texel coordinates (v) using b1main and b2main coefficients and solving for v_main, dv_main, d2v_main, dv_ortho, d2v_ortho, and dv_ortho_add parameters; and supplying said v_main, dv_main, d2v_main, dv_ortho, d2v_ortho, and dv_ortho_add parameters to said interpolation driven second order texture mapping process.

17. A computer system as described in claim 15 wherein said step e) solves for the following relationships for three horizontal scan lines within said triangle polygon:

$$a1i * \Delta xi + a2 * \Delta xi^2 + i\mathrm{main}(u) = i(u); \qquad (1)$$

$$a1\mathrm{mid} * \Delta x\mathrm{mid} + a2 * \Delta x\mathrm{mid}^2 + \mathrm{midmain}(u) = \mathrm{mid}(u); \text{ and} \qquad (2)$$

$$a1j * \Delta xi + a2 * \Delta xj^2 + j\mathrm{main}(u) = j(u); \qquad (3)$$

where relationship (1) corresponds to a scan line above said middle vertex including a point i, relationship (2) corresponds to a scan line including said middle vertex, and relationship (3) corresponds to scan line below said middle vertex including a point j.

18. A computer system as described in claim 17 wherein said step e) further solves for the following relationships:

$$a1i + [\Delta yi - \mathrm{mid} * du\_\mathrm{ortho\_add}] = a1\mathrm{mid}; \text{ and}$$

$$a1i + [\Delta yi - j * du\_\mathrm{ortho\_add}] = a1j.$$

19. A computer system as described in claim 15 wherein said step b) is performed by solving the following relationships:

$$a1\mathrm{main} = [-3 * v\mathrm{min}(u) + 4 * u1 - v\mathrm{max}(u)] * \Delta x/\Delta y$$

$$a2\mathrm{main} = [2 * (v\mathrm{min}(u) - 2 * u1 + v\mathrm{max}(u))] * (\Delta x/\Delta y)^2.$$

* * * * *